United States Patent
Engel (10) Patent No.: US 12,322,033 B2
(45) Date of Patent: Jun. 3, 2025

(54) COMPUTER-IMPLEMENTED METHOD FOR RENDERING MEDICAL VOLUME DATA

(71) Applicant: Siemens Healthcare GmbH, Erlangen (DE)

(72) Inventor: Klaus Engel, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/450,093

(22) Filed: Aug. 15, 2023

(65) Prior Publication Data
US 2024/0062454 A1 Feb. 22, 2024

(30) Foreign Application Priority Data
Aug. 17, 2022 (EP) .................................... 22190815

(51) Int. Cl.
*G06T 15/08* (2011.01)
*G06T 19/20* (2011.01)

(52) U.S. Cl.
CPC .............. *G06T 15/08* (2013.01); *G06T 19/20* (2013.01); *G06T 2210/41* (2013.01); *G06T 2219/2016* (2013.01)

(58) Field of Classification Search
None
See application file for complete search history.

(56) References Cited

U.S. PATENT DOCUMENTS

| 2004/0249303 | A1* | 12/2004 | Serra | G06F 3/04845 |
| | | | | 600/545 |
| 2006/0028469 | A1* | 2/2006 | Engel | G06T 15/08 |
| | | | | 345/426 |
| 2006/0071930 | A1 | 4/2006 | Fujiwara et al. | |
| 2006/0256111 | A1* | 11/2006 | Chihoub | G06T 15/08 |
| | | | | 345/424 |

(Continued)

FOREIGN PATENT DOCUMENTS

| JP | 2006 107093 A | 4/2006 |
| JP | 2006340774 A | 12/2006 |

(Continued)

OTHER PUBLICATIONS

Thomas Luft, Carsten Colditz, Oliver Deussen, "Image Enhancement by Unsharp Masking the Depth Buffer", Jul. 1, 2006, ACM, ACM Transactions on Graphics, vol. 25, Issue 3, pp. 1206-1213.*

(Continued)

*Primary Examiner* — Robert Bader
(74) *Attorney, Agent, or Firm* — Harness, Dickey & Pierce, P.L.C.

(57) ABSTRACT

A computer-implemented method for rendering medical volume data including first volume data is described. The method comprises: performing a first volume rendering process on the first volume data to generate a first volume rendering of the first volume data. The first volume rendering process includes determining first depths of respective locations of the first volume rendering and storing the depths in association with the respective locations. The method also (Continued)

comprises performing a further process, including a second volume rendering process, on the medical volume data, to generate a second volume rendering, using the determined first depths and respective locations.

16 Claims, 5 Drawing Sheets

(56) References Cited

U.S. PATENT DOCUMENTS

| | | |
|---|---|---|
| 2007/0229500 A1 | 10/2007 | Engel et al. |
| 2009/0103793 A1 | 4/2009 | Clark et al. |
| 2017/0294042 A1 | 10/2017 | Engel |
| 2023/0334732 A1 | 10/2023 | Wiemker et al. |

FOREIGN PATENT DOCUMENTS

| | | |
|---|---|---|
| JP | 2023547526 A | 11/2023 |
| WO | WO 2008059417 A1 | 6/2008 |

OTHER PUBLICATIONS

Takafumi Saito, Tokiichiro Takahashi, "Comprehensible Rendering of 3-D Shapes", Sep. 1, 1990, ACM, Siggraph '90: Proceedings of the 17th Annual Conference on Computer Graphics and Interactive Techniques, pp. 197-206.*

Denis Kalkofen, Erick Mendez, Dieter Schmalstieg, "Interactive Focus and Context Visualization for Augmented Reality", Nov. 16, 2007, IEEE, 2007 6th IEEE and ACM International Symposium on Mixed and Augmented Reality.*

Zhang, Wenhui et al: "Medical vol. Reconstruction Techniques", arxiv.org, Cornell University Library, 201 Olin Library Cornell University Ithaca, NY 14853, Feb. 21, 2018 (Feb. 21, 2018), XP081217434.

Extended European Search Report for European Patent Application No. 22190815 dated Mar. 15, 2023.

* cited by examiner

Fig 7

COMPUTER-IMPLEMENTED METHOD FOR RENDERING MEDICAL VOLUME DATA

CROSS-REFERENCE TO RELATED APPLICATION(S)

The present application claims priority under 35 U.S.C. § 119 to European Patent Application No. 22190815.5, filed Aug. 17, 2022, the entire contents of which are incorporated herein by reference.

FIELD

One or more example embodiments of the present invention relate to a computer-implemented method for rendering medical volume data. One or more example embodiments of the present invention also relate to a non-transitory computer-readable medium storing a set of computer-readable instructions for implementing the method, and/or an apparatus for implementing the method.

BACKGROUND

In medical imaging, physiological volume data, e.g. information on the cellular level, may be used to provide insights into pathological changes in the human body. Physiological volume data may, for example, be obtained by acquisition methods such as sodium and CEST (chemical exchange saturation transfer) 7T MRI. Areas of increased activity or unusual variations of chemical concentration represented by such physiological volume data may reveal pathological information about the patient. For example, areas having a high density of sodium may indicate the presence of a tumor.

In some cases, it may be desirable to visualize the physiological data in combination with other volume information, such as anatomical volume data representing the anatomy of the patient. The anatomical data may, for example, be obtained by a different imaging modality or a different scan protocol to the physiological data. For example, the anatomical volume data may be obtained by an MRI scan protocol such 7T MRI MPRage (Magnetization Prepared Rapid Gradient Echo). Visualizing the physiological volume data and the anatomical volume data together may, for example, help provide spatial context about the physiological data in the anatomy of the patient.

In 2D slice rendering, visualizing physiological volume data may be straightforward. For example, physiological information may be visualized in combination with anatomical information using multi-planar reformation (MPR) with 2D slices being overlaid with color-coded information representing different values of the physiological data. Different color transfer functions, such as heat and spectral maps, for example, may be used to reveal regions of increased activity or unusual variations of chemical concentration.

However, rendering such information with 3D rendering may present challenges. For example, often, data values of the physiological volume data which are of interest are embedded in a shell of other data values. Higher data values of the physiological information may, for example, be surrounded by and therefore completely hidden by a shell of lower values of the physiological data. Furthermore, in cases where the physiological data is visualized in combination with anatomical data, the physiological data may often be embedded in the anatomical data. For example, areas of interest of the physiological data may be inside organs and anatomy and therefore. The areas of interest of the physiological information may therefore be occluded by the anatomical information.

SUMMARY

According to a first aspect of embodiments of the present invention, there is provided a computer-implemented method for rendering medical volume data comprising first volume data, the method comprising: performing a first volume rendering process on the first volume data to generate a first volume rendering of the first volume data, the first volume rendering process comprising determining first depths of respective locations of the first volume rendering and storing the depths in association with the respective locations; and performing a further process, comprising a second volume rendering process, on the medical volume data, to generate a second volume rendering, using the determined first depths and respective locations.

The first volume rendering process may comprise a maximum intensity projection and/or a minimum intensity projection volume rendering process.

The first volume rendering process may comprise: determining, for a given first sample point in the first volume data, the given first sample point being associated with a given respective location of the respective locations, a first visual parameter value; and storing the first visual parameter value in association with the given respective location.

The using the determined first depths and respective locations to generate the second volume rendering may comprise: setting, on the basis of the first depths and respective locations, a parameter value of the second volume rendering process; and/or modifying, on the basis of the first depths and respective locations, an output of the second volume rendering process.

The second volume rendering process may be a physically-based volume rendering process.

The second volume rendering process may comprise determining second depths of the respective locations and storing the second depths in association with the respective locations, and the setting or the modifying may be performed, for a or the given location of the respective locations, on the basis of a comparison between the first depth and the second depth of the given location.

The parameter value of the second volume rendering process may be a visual parameter value of a given second sample point associated with the given location, and the setting may comprise determining the visual parameter value of the given second sample point based on a or the first visual parameter value from the first volume rendering process.

The modifying may comprise determining a rate of change of the first depths with respect to the respective locations and modifying a visual parameter value of the output of the second volume rendering process on the basis of the determined rate of change.

The visual parameter value of the output of the second volume rendering process may be a visual parameter value of a or the given location of the respective locations, and the modifying the visual parameter value on the basis of the determined rate of change may comprise determining, at the given location, that the determined rate of change meets a pre-determined threshold, and, on the basis that the determined rate of change meets the pre-determined threshold, modifying the visual parameter value of the given location.

The modifying may comprise combining, at a given location of the respective locations, a or the first visual parameter value from the first volume rendering process with a second visual parameter value from the second volume rendering process.

The medical volume data may comprise a combination of the first volume data and second volume data having a pre-determined spatial relationship with the first volume data, and the performing the further process may comprise performing the second volume rendering process on the combination of the first volume data and the second volume data.

The first volume data may comprise physiological volume data and second volume data may comprise anatomical volume data.

According to a second aspect of embodiments of the present invention, there is provided a set of machine-readable instructions which when executed by a processor cause a method according to the first aspect of embodiments of the present invention to be performed.

According to a third aspect of embodiments of the present invention, there is provided a non-transitory machine-readable (or computer-readable storage) medium comprising a set of machine-readable (or computer-readable) instructions according to the second aspect of embodiments of the present invention.

According to a fourth aspect of embodiments of the present invention, there is provided apparatus comprising at least one processor and a memory (or storage) comprising and/or storing a set of machine-readable instructions which when executed by the processor cause the processor to perform a method according to the first aspect of embodiments of the present invention.

BRIEF DESCRIPTION OF THE DRAWINGS

The present invention will now be described, by way of example only, with reference to the following figures, in which.

DETAILED DESCRIPTION

According to certain examples described herein, medical volume data comprising first volume data is rendered by a method involving a first volume rendering process and a further process comprising a second volume rendering process. The first volume rendering process involves determining depths of locations of a first volume rendering of the first volume data. The first volume data may, for example, comprise physiological volume data, such as data on a cellular level representing sodium concentration or CEST data.

The first volume rendering process may, for example, involve performing a maximum intensity projection or a minimum intensity projection on the first volume data and determining respective depths of each pixel in the rendering and storing the respective depths for each pixel in a buffer. The depths obtained by the first volume rendering process may, for example, represent areas of interest of physiological data of the medical volume data, such as areas in the medical volume having a high concentration of a particular substance, e.g. sodium, or areas having an unusual degree of chemical activity, e.g. as indicated by CEST scan data.

The further process comprises using the depths determined by the first volume rendering process to render the medical volume. For example, the further process may involve performing a physically-based, e.g. path tracing, volume rendering process on the medical volume data. In some cases, the medical volume data also comprises second volume data, such as anatomical volume data, e.g. obtained by an MRI scan protocol such 7T MRI MPRage.

The method may, for example, allow for the final rendering of the medical volume to convey to a user visual information relating to parts of the medical volume which are of particular interest, e.g. areas of maximum intensity or minimum intensity of physiological data, while providing the user with the overall context of the medical volume data, e.g. the shape and relative depths of various parts of the medical volume data. For example, by using the depths obtained in the first volume rendering process in the further process, in certain examples, it may be ensured that areas of interest of the first volume data are visible in the final rendering of the medical volume data even if those areas are occluded by other parts of the medical volume.

Figure 1:
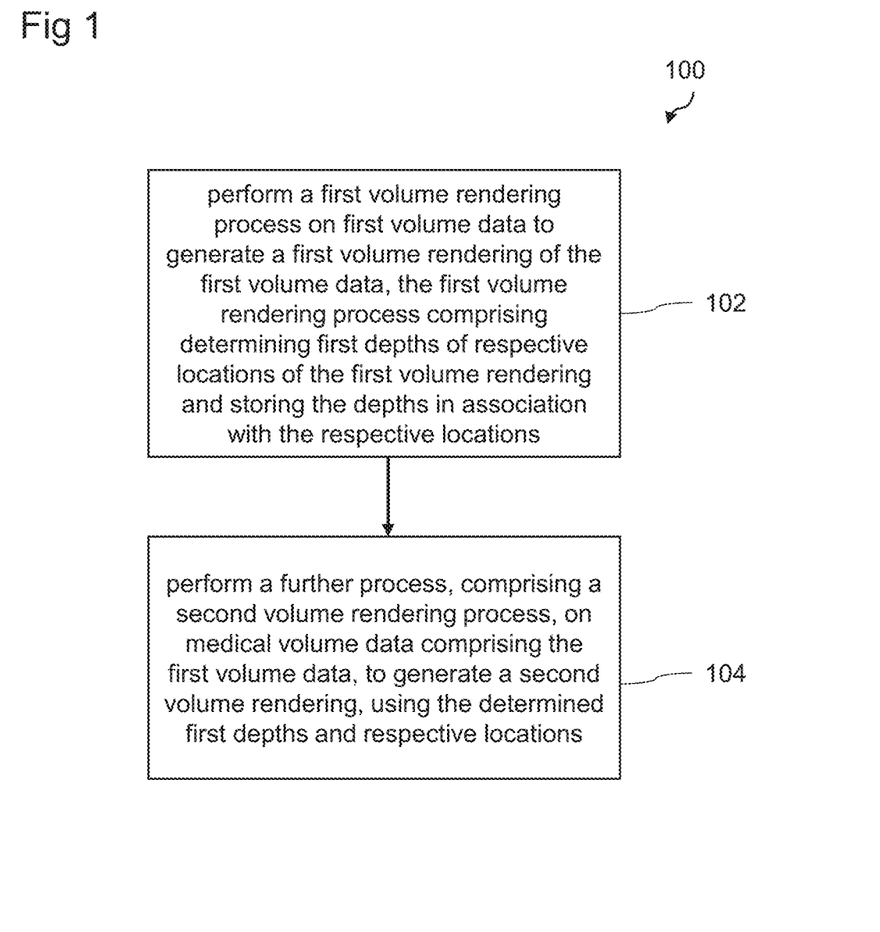
FIG. 1 illustrates a flow chart representation of a computer-implemented method for rendering medical volume data comprising first volume data.

FIG. 1 shows a flow chart representation of an example method 100 for use in rendering medical volume data comprising first volume data.

The first volume data may comprise a discrete sampling of a scalar field. The first volume data may, for example, be received by loading from a memory, sensors, and/or other sources. The first volume data may represent a patient or a part of a patient, for example a human or animal patient.

In general, any suitable scanning modality which will produce a volumetric dataset may be used to produce the first volume data. For example, the scanning modality may comprise the use of computed tomography (CT), or of magnetic resonance imaging (MRI). In some examples a scanning modality comprising the use of positron emission tomography (PET), single photon emission computed tomography (SPECT), ultrasound, or another scan modality may be used. Scan data may be provided in the form of multiple two-dimensional (2D) scans or may be formatted from a scan. In some examples, the first volume data is a DICOM dataset created by scanning at least a portion of a patient using a scanning modality.

The volumetric dataset may comprise data formatted as a plurality of voxels. The voxels may, for example, be in a uniform or non-uniform grid, or may be arranged in some other type of geometry (e.g., polar coordinate format). The voxels may be isotropic or anisotropic. Each voxel may typically represent a scalar value obtained by sampling a scalar field, although in some examples the first volume data may comprise data relating to a non-scalar field. The type of value represented by each voxel may be dependent on the means, manner or mechanisms by which the first volume data is obtained. For example, where a CT scanner is used to produce the first volume data, the dataset may comprise Hounsfield values.

As mentioned above, in certain examples, the first volume data may be physiological volume data. For example, the first volume data may be physiological volume data obtained by an imaging modality used to reveal physiological information on a cellular level, such as a sodium or CEST 7T MRI scan modality.

At block 102, the method 100 comprises performing a first volume rendering process on the first volume data to generate a first volume rendering of the first volume data.

The first volume rendering process comprises determining first depths of respective locations of the first volume rendering and storing the depths in association with the respective locations.

The first volume rendering process may comprise a maximum intensity projection and/or a minimum intensity projection volume rendering process. For example, the first volume rendering process may comprise determining a maximum intensity projection of the first volume data. In other examples, the first volume rendering process may comprise determining a minimum intensity projection of the first volume data. Whether a maximum intensity projection, minimum intensity projection or both are determined may depend on which of the maximum and minimum intensities of the first volume data are of interest for the clinical context for which the visualization is being generated.

For the first volume rendering process, upper and lower limits of the values of the first volume data may be set in order to constrain the visualization of the first volume data to a certain range of values in the first volume data. For example, the first volume rendering process may comprise selecting a sub-range of the first volume data and performed the maximum or minimum intensity projection on the selected sub-range of values of the first volume data. This may allow for the visualization of the first volume data to be limited to ranges of values which correspond to areas of interest. For example, when the first volume data represents sodium concentration in the medical volume, in certain contexts, only relatively high values of sodium concentration may be of interest. The range of the first volume data which is rendered may, for example, be controlled by the user setting upper and lower bounds on the first volume data.

The first volume rendering process may involve defining a viewpoint and a viewing plane with respect to the first volume data and casting a plurality of rays, originating at the viewpoint, through the viewing plane and through the first volume data. Each ray may be cast through a particular location in the viewing plane, e.g. a given pixel in the viewing plane. Determining the maximum intensity projection comprises determining a maximum value of the first volume data along each ray. For each maximum value, a corresponding first depth is stored, e.g. in a variable or a buffer for the pixel corresponding to the ray. An example of this will be described in more detail below with reference to FIG. 2.

In some examples, the first volume rendering process may comprise determining a minimum intensity projection of the first volume data, for example as an alternative to or in addition to determining a maximum intensity projection. A minimum intensity projection may be determined in a similar manner to a maximum intensity projection by determining minimum, rather than maximum, values along each ray cast through the volume.

In some examples, the first volume rendering process may comprise determining a first visual parameter value for sample points in the first volume data. For example, when determining a maximum or minimum intensity projection, a color and/or an opacity may be computed and stored for the sample point with the maximum or minimum value for each pixel.

The first visual parameter value for a given sample point may be determined by a use of a transfer function. For example, a color may be computed for a sample point by using the value of the first volume data at the sample point to look up a color value from a color map. The color map may be window levelled. That is, the color map may be mapped to an appropriate, e.g. pre-defined or user controlled, range of values of the first volume data in order to provide the desired mapping of colors to values of the first volume data.

The result of the first volume rendering process is a first volume rendering of the first volume data, which may, for example, comprise a buffer containing depth values for each pixel in a viewing plane and which may also contain for each pixel a color value corresponding to the maximum/minimum value of the first volume data for that pixel.

Figure 2:
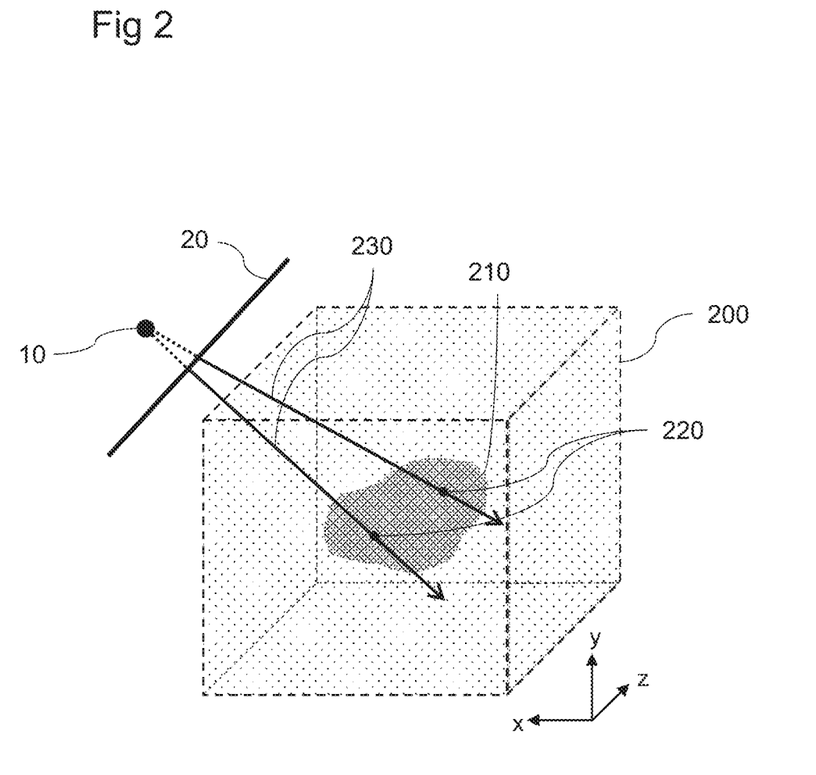
FIG. 2 illustrates schematically aspects of a first volume rendering process of an example method of rendering the medical volume data.

Referring now to FIG. 2, there is illustrated schematically an example of the first rendering process performed first volume data 210 of a medical volumetric dataset 200. In this example, the first volume data 210 is physiological volume data. The first rendering process forms part of an example method of rendering the medical volumetric dataset 200.

In the example first volume rendering process represented by FIG. 2, a viewpoint 10 is defined with respect to the volumetric dataset 200. A viewing plane 20 is also defined and located in front of the viewpoint 10. The viewing plane 20 comprises a plurality of pixels (not shown in FIG. 2), e.g. arranged in a grid, and allows construction of a visualization of the volumetric dataset 200, as viewed from the viewpoint 10.

In this example, the first volume rendering process comprises a maximum intensity projection process performed on the first volume data 210. To generate the maximum intensity projection as viewed from the viewpoint 10, a plurality of rays 230 through the first volume data 210 are determined, e.g. by ray casting. The first volume data 210 is sampled at a plurality of points along each ray 230. In this example, along each ray a maximum-value sample point 220 is determined. The maximum-value sample point 220 for a given ray 230 is a sample point where the sampled value of the first volume data 210 is at a maximum out of the samples along the ray 230. A first depth of each of the maximum-value sample points 220, e.g. a distance along the ray 230 from the viewpoint 10 to the maximum-value sample point 220, is computed. Each of the first depths is stored in a buffer in association with the pixel in the viewing plane 20 to which the depth corresponds.

Where, for a given ray, there is no sample point along the ray with a non-zero value, a depth of infinity may be stored in the buffer for the pixel corresponding to that ray. In this example, at each of the maximum-value sample points 220, a color value is also determined by mapping the value of the first volume data 210 at the maximum-value sample point 220 to a color value, e.g. using a color map. The color value for the maximum-value sample point 220 is also stored in association with the relevant pixel in the viewing plane 20. When there is no sample point along a given ray with a non-zero value a null color value or no color value may be stored or the color value may be undefined.

In this example, the result of the first rendering process is a maximum intensity projection of the first volume data 210 comprising, for each of the pixels in the viewing plane 20, a first depth value and a color value. This maximum intensity projection may provide useful information regarding areas of interest in the physiological data, which can be used, as will be described in more detail below, to provide a visualization of the medical data 200.

Returning now to FIG. 1, at block 104, the method 100 comprises performing a further process on the medical data comprising the first volume data to generate a second volume rendering.

The further process comprises a second volume rendering process and comprises using the first depths and respective locations, e.g. to set a parameter value of the second volume rendering process or to modify an output of the second volume rendering process. For example, the first depths may be used during the second volume rendering process to set a color and/or an opacity at sample points of the second volume rendering process. This may, for example, allow for occluded parts of interest of the first volume data to be visualized by modifying a color and/or opacity of parts of the medical volume data which occlude the parts of interest of the first volume data. Additionally, or alternatively, the first depths may be used to modify a color of locations, e.g. pixels, in an output of the second volume rendering process, based on the first depths. This may also, for example, allow for parts of interest of the first volume data to be visualized effectively in the visualization of the medical volume data.

In some examples, as will be described below, the medical volume data comprises a combination of the first volume data and second volume data, e.g. physiological volume data and anatomical volume data respectively.

The second volume rendering process is performed from the same viewpoint and for the same viewing plane as the first volume rendering process. Accordingly, locations in the first volume rendering, e.g. pixels for which a maximum or minimum intensity projection has been computed, correspond with locations in the second volume rendering, e.g. pixels in the visualized image of the medical volume data.

The second volume rendering process may be a physically-based volume rendering process, e.g. a path tracing process or in other examples may be a direct volume rendering process, e.g. a ray casting process.

In some examples, the second volume rendering process comprises determining second depths of the respective locations corresponding to the first depths determined during the first volume rendering process. For example, for a given pixel, the second depth may be computed as the distance from the viewing point, along a given ray, to the closest non-fully transparent part of the medical volume data. This second depth therefore may represent the closest surface in the medical data which is encountered by a simulated light path starting at the viewpoint and cast through a given pixel in the viewing plane. An example of this is described below with reference to FIG. 3.

As mentioned above, in some examples, the second depths may be used in combination with the first depths, to set parameter values, such as color and/or opacity values, of sample points during the second volume rendering. For example, in some examples, a parameter value of the second volume rendering process may be set based on a comparison between the first depth and the second depth for a given pixel. The comparison of the first and second depths may give an indication of whether the sample point is in front of, i.e. closer to the viewpoint than, or behind, i.e. further from the viewpoint than, the maximum-value sample point from the first volume rendering process to which the first depth corresponds. This information may be used to determine whether or not the sample point occludes the maximum-value sample point of the first volume data.

In some examples, if a given sample point occludes the maximum-value sample point, then the given sample point may be tinted with a color of the maximum-value sample point. For example, a color associated with the given sample point may be combined with a color of the maximum-value sample point, e.g. by adding or multiplying the colors. The color associated with the given sample point may be obtained by applying a transfer function to the value of the medical volume data at the given sample point. The color of the maximum-value sample point may have been determined during the first volume rendering process, by the application of a color map/transfer function to the first volume data, as described above. This tinting of the given sample point may allow for occluded areas of interest of the first volume data to still be visualized. For example, higher physiological data values embedded in a shell of lower data values may be visualized by tinting the lower data values with a color associated with the higher data values. Similarly, as will be described below, physiological data values which are embedded in anatomical data may be visualized by tinting the anatomical data.

As mentioned above, in some examples, the medical volume data comprises a combination of the first volume data and second volume data, where the first volume data and the second volume data have a pre-determined spatial relationship with one another. For example, the medical volume data may comprise physiological data and anatomical data in registration with one another.

In examples, the second volume data may be obtained by any of the methods described above with reference to the first volume data. The second volume data in some examples is obtained by a different imaging modality or scan protocol to the first volume data. For example, where the first volume data is physiological volume data showing sodium concentration or CEST data obtained by a 7T MRI scan protocol, the second volume data may be anatomical volume data which is also obtained by a different 7T MRI scan protocol, such as MPRage.

Where the medical volume data on which the second rendering process is performed comprises physiological volume data and anatomical volume data, the physiological data can often be embedded within the anatomical data. As such, for a given pixel, the second depth may often be a depth of the anatomical data while the first depth is a depth of the physiological data. In such cases, the anatomical data may be tinted with a color of the physiological data. On the other hand, in some examples, from the perspective of the rendering viewpoint, higher values of physiological data may be embedded in lower values of the physiological volume data. In such cases, for a given pixel, the second depth will be a depth of a lower value of the physiological data and the first depth a depth of a higher value of the physiological data. In such examples, tinting may also be applied to the lower values of the physiological volume data in order to visualize the embedded higher values of the physiological volume data.

In some examples, where the first volume data and the second volume data spatially overlap in the medical volume data, colors and/or opacity values for the overlapping parts may be determined by combining colors and/or opacities of the first volume data and the second volume data. The combining of the colors and/or opacities may comprise, for example, adding or multiplying the colors. The colors may be obtained, as described above, by the application of separate transfer functions to the first volume data and the second volume data. Where, for example, the first volume data is physiological data and the second volume data is anatomical data, this may allow the anatomical data to be tinted with a color of the physiological data, or vice-versa, or for one of the color of the physiological data and the color of the anatomical data to replace the other. This combining of colors/opacities may be done in addition to, or alternatively to, the above-described tinting of sample points which occlude maximum values of the physiological data.

In addition, in some examples, the method may involve the application of clipping tools, such as clip planes, crop boxes, segmentation masks etc. The application of these clipping tools may be limited to the first volume rendering process or the second volume rendering process only or may be applied to both processes. Further, the application of these tools may be limited to one or the other of the first volume data and the second volume data. This may allow, for example, embedded physiological volume data to be revealed inside the anatomical volume data by clipping into the anatomical volume data while leaving the physiological volume data unclipped.

In examples described above, the first depths are used during the second volume rendering process, e.g. to tint sample points during a physically-based rendering process. However, additionally, or alternatively, in some examples, the first depths may be used to modify an output of the second volume rendering process. In such cases, the further process comprises the second volume rendering process as well as the subsequent modifying of the output of the second volume rendering process to produce the second volume rendering, i.e. the final visualization of the medical volume data. For example, pixel values of a rendering output by the second volume rendering process may be modified based on the first depths to draw silhouettes around parts of the first volume data or to shade parts of the first volume data. These silhouettes or this shading may be applied on the basis of image-space partial derivatives of the first depths, indicating regions where the first depths change significantly from pixel to pixel, which may be indicative of edges of features of the first volume data. Examples of this will be described in more detail below.

Figure 3:
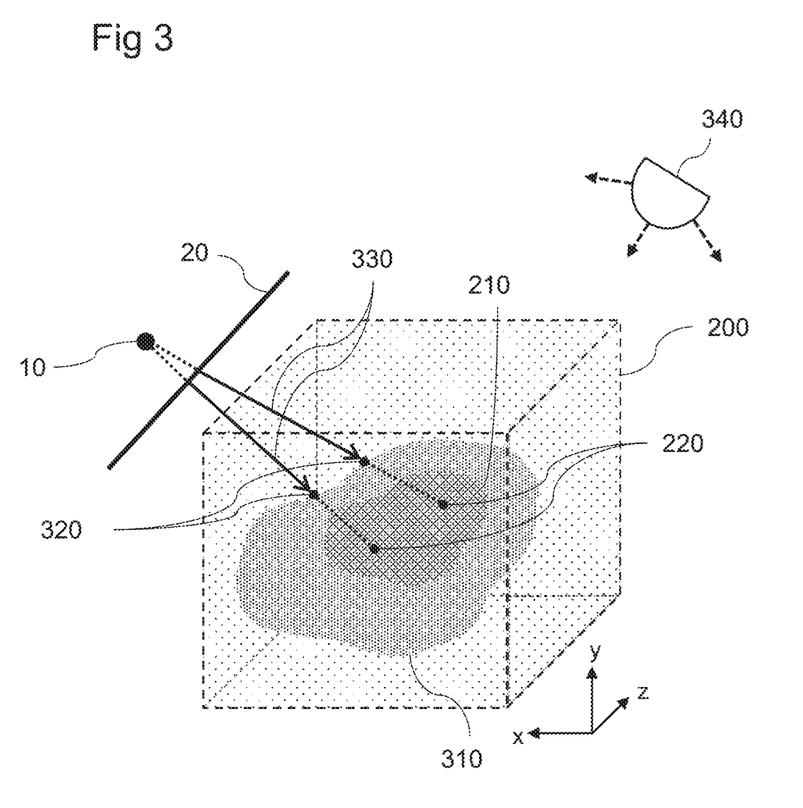
FIG. 3 illustrates schematically aspects of a second volume rendering process of the example method of FIG. 2.

Turning now to FIG. 3, aspects of the second volume rendering process are shown, by way of example. FIG. 3 shows the medical volumetric dataset 200 comprising both the first volume data 210, which is physiological volume data, e.g. obtained by a sodium or CEST MRI scan protocol, and second volume data 310, e.g. anatomical data obtained by a different MRI scan protocol. The first volume data 210 and the second volume data 310 are in registration with one another in the medical volumetric dataset 200. Although the first volume rendering process described with reference to FIG. 2 is performed only on the first volume data 210 of the medical volumetric dataset 200, the second volume rendering process shown in FIG. 3 is performed on the combination of the first volume data 210 and the second volume data 310.

FIG. 3 illustrates an example of the second volume rendering process performed on the combination of the first volume data 210 and the second volume data 310. The second volume rendering process in this example is a physically-based rendering process.

In the physically-based rendering process shown in FIG. 3, to render a visualization of the volumetric dataset 200 as viewed from the viewpoint 10, a plurality of paths 330 through the volume 200 are determined and each of the paths is used to determine a light contribution to a given pixel in the viewing plane 20. According to the present example, the paths 330 are determined according to a physically-based path tracing method. However, in other examples, the paths 330 may be determined by a direct volume rendering approach, such as a ray casting approach.

Path tracing simulates light propagation through the volume 200, including simulating scattering and absorption, by tracing a plurality, for example millions, of simulated light paths 330. Each of the light paths 330 is used to generate an estimate of light hitting a given pixel in the image plane 20. The estimate for a given path 330 is determined by sampling the volume 200 at a plurality of sample points along the path 330, e.g. sampling at equidistant intervals along the path. By averaging many such estimates, an image is rendered on the image plane 20. According to an example, to create a single estimate of light hitting a pixel in the image plane 20, a light path 330 is traced from the viewpoint 10 through a given pixel in the image plane 20 and through the volume 200 with an initial ray for the path 330 beginning from the viewpoint 10 being generated for a random position in a pixel on the image plane 20. The ray direction is determined by connecting this random position in the pixel with a random position on a simulated camera lens (not shown) at the viewpoint 10. The intersection of the ray, refracted by the camera lens, with a bounding box of the volume 200 is then computed and a scattering position (not shown) for the ray inside the volume 200 is determined, e.g. by Woodcock tracking.

The path 330 is then continued by determining a new ray originating at the scattering location. A direction of the new ray may, for example, be determined using a phase function, i.e. a probability density function for the scattering direction, at the scattering position. The phase function may, for example, be determined based on an interpolated value of the volumetric dataset 200 (e.g. a Hounsfield value where the volumetric dataset is produced by CT scanning) at the scattering position.

The new ray is traced in a similar manner to the initial ray to determine a next scattering position for the path 330, and the same operations are performed at the next scattering position as at the first scattering position. This path tracing process continues until a ray of the path 30 is absorbed by the volumetric dataset 200 or leaves the volumetric dataset 200. Absorption by the volumetric dataset 200 can be modelled, for example, either using a maximum threshold for the number of scattering events or probabilistically using an extinction probability density function based on the number of scattering events. In an example, if the path 330 is still inside the volume 200 after the maximum threshold number of scattering events, the path 330 makes no contribution to the detector pixel to which it corresponds. If the path 330 leaves the volume 200 within the given number of scattering events, a light contribution for the path 330 is determined and provides an estimate for light hitting the pixel to which the path 330 corresponds.

To determine the light contribution of a given path 330 to its associated pixel, the path 330 is sampled at a plurality of points along the path 330 and data is gathered at the sampled points to generate a contribution to a display value for the pixel associated with the given path 330. By generating many such paths 330 and determining their contributions to the display values of their associated pixels in the image plane 20, an image of the volume 200 is generated, e.g. with the image being progressively refined as the number of paths 330 traced increases.

In examples, a rendering algorithm may model an illumination effect by modelling a light source 340 illuminating the volume 200. The illumination effect may be taken into account when determining opacity and color values at the sample points. For example, a shading computation may be applied at the sample point, taking into account simulated light at the sample point. The light source 340 may be a point source, a directional light source, or may comprise a light map. The simulation light source may also be any other kind of light source—e.g. a model of any object which emits light—or a combination of multiple different light sources. In some examples, parts of the volumetric dataset 200 itself may emit light. In some examples, the light source may comprise a high definition light map. The light map may, for example, when the volumetric dataset 200 is cuboidal, have six sides corresponding to outer sides of the volumetric dataset 200.

As mentioned above, for sample points in the volumetric dataset 200 where the first volume data 210 and the second volume data 310 overlap, shading may be computed by combining a color and/or opacity associated with the first volume data 210 with a color and/or opacity associated with the second volume data 310. For example, separate transfer functions may be applied to values of the first volume data 210 and the second volume data 310 to obtain respective colors and/or opacities for a given sample point. This may also be referred to as classification of the volume data 210, 310. These colors and/or opacities may be blended or otherwise used in combination to obtain a color and/or an opacity for the given sample point to be used in the physically-based volume rendering process.

Moreover, in this example, during the tracing of a given path 330, when the non-fully transparent sample point 320 which is closest to the viewing plane 10 is encountered, the depth of this sample point 320, e.g. the distance from the sample point 320 to the viewpoint 10, is determined. This depth, referred to herein as a second depth, is stored in a buffer associated with the pixel with which the given path 330 corresponds.

In some examples, when computing shading of the sample point 320 by tracing a ray 330 corresponding to a given pixel, the depth of the sample point 320, i.e. the second depth, is compared to the depth of the maximum-value sample point 220 corresponding to the given pixel, i.e. the first depth associated with the given pixel. If the first depth is greater than the second depth, as is the case for the two example rays 330 shown in FIG. 3, then the computation of the shading at the sample point 320 involves determining the shading of the sample point 320 based at least in part on the color of the first volume data 210 at the maximum-value sample point 220, i.e. the color which was determined during the first volume rendering process. The shading may, for example, comprise combining a color of second volume data 310 at the sample point 320 with the color of the maximum-value sample point 220. This provides a tinting of the sample point 320 based on the color of the maximum-value sample point 220, allowing the maximum-value sample point 220 to be visualized despite its lying behind, from the perspective of the viewpoint 10, the feature of the second volume data 310 at which the sample point 320 is located.

While the example of FIG. 3 shows a path tracing volume rendering process, the second volume rendering process may in other examples be a ray casting process. Ray casting may involve traversing a plurality of rays through the volume, each ray originating at the viewpoint and passing through a given pixel in the viewing plane and through the volumetric dataset 200 in a straight line. The volume may be sampled at a plurality of sample points along each ray, with visual parameter data, e.g. color and/or opacity data, at each of the sample points being used to determine a color for the pixel to which the ray corresponds.

Although not shown in FIGS. 2 and 3, as described above, in certain examples, the output of the second volume rendering process is modified based at least in part on the first depths computed during the first volume rendering process. This modifying of the output of the second volume rendering process may be done in addition to or alternatively to using the first depths and locations during the second volume rendering process.

In some such examples, the output of the second volume rendering process is modified by an additional image-space rendering pass. For example, image-space partial derivatives of the first depth values may be computed and used to determine whether and how to modify the output of the second volume rendering process.

For example, an image-space partial derivative of the first depths is computed for pixels in the output of the second volume rendering process and if the partial derivative meets a pre-determined, e.g. fixed or user-defined, threshold, the color of the output pixel is modified. A large image-space partial derivative of the depths may, for example, indicate an edge of a physiological feature in the first volume data. The color of pixels where the image-space partial derivative meets the threshold may be changed to a pre-defined color, e.g. white. This may allow a silhouette to be generated for features in the first volume data. In some examples, partial derivatives taking into account the rate of change in image space of the first depths for two orthogonal directions, e.g. d/dx and d/dy partial derivatives, may be used to determine whether and how to modify the output. In other examples, only one partial derivative may be used, which may provide silhouettes only on certain, e.g. horizontal or vertical, edges of the features of the first volume data.

The computation of the partial derivatives may be highly computationally efficient. For example, d/dx and d/dy partial derivative computations may be built into modern GPUs.

Furthermore, in some examples, the area of the volume rendering inside a silhouette may be re-colored during the image-space pass. For example, in some examples, the modifying of the color of the pixel may depend not only on whether the value of the partial derivative meets the threshold, but also on the actual value of the partial derivative. For example, pixels with partial derivative values well in excess of the threshold may be colored white to provide a silhouette of a feature while pixels with lower partial derivative values may be shaded or hatched. This may help provide greater visibility and/or context to the user about the feature of the first volume data being visualized.

In some examples, a comparison of the first depths and the second depths may be used to determine whether and how to modify the output of the second volume rendering process. For example, for each pixel in the output of the second volume rendering process, a check may be performed to determine whether the first depth is greater than the second depth. The modifying may then be performed on the basis of the check. In some examples, the computing of the partial derivative/s and the comparing of the partial derivative/s to a threshold is only computed for a given pixel if the check of the first depth against the second depth provides a given result, e.g. the first depth is greater than the second depth.

This allows for, for example, silhouettes to be drawn around only embedded physiological data or only non-embedded physiological data. For example, silhouettes may be applied only to first volume data which is occluded, e.g. by the second volume data, by only modifying the color of pixels where the first depth is greater than the second depth. Alternatively, silhouettes may be applied only to first volume data which is not occluded by modifying the color of pixels only where the first depth is not greater than the second depth. Alternatively, e.g. by omitting any such check, silhouettes may be applied to the first volume data regardless of whether or not the first volume data is occluded.

Additionally, or alternatively, in some examples, the output of the second volume rendering process may be modified based on color values determined during the first volume rendering process for maximum-value sample points in the first volume data. This can allow tinting of the rendering to be performed in the image-space pass, for example in addition to or alternatively to applying tinting during the physically-based volume rendering process. For example, if, for a given pixel in the output of the physically-based rendering process, the first depth is determined to be greater than the second depth, this indicates that a maximum intensity point in the first volume data lies behind other volume data. In such an example, a color of the maximum-value sample point determined during the first volume rendering process and a color value from the second volume rendering process may be combined to generate a modified color of the given pixel.

The method may provide improvements in the visualization of embedded volume data, such as data values of interest of physiological volume data which are embedded in other volume data such as other physiological data or anatomical data. As mentioned above, while such occlusion is generally not a problem in 2D slicing imaging techniques, in 3D rendering, data values of interest, e.g. high values of physiological data, can be hidden by other values, e.g. lower values of physiological data.

In 3D rendering, clip planes, crop boxes, windowing of transfer function and the segmentation of volumetric data with selective removal of occluding data may typically be used to overcome such limitations in volumetric rendering. For example, for the visualization of the brain, brain isolation segmentation masks may be generated to prevent the skull from occluding the view on the brain surface of a patient. For example, segmentation masks in form of auxiliary volume data may be used as segmentation information. Clip planes and crop boxes may be used to geometrically remove anatomy occupying selected spatial areas of the acquisition domain. Such techniques alone, however, may not be able to provide an effective visualization of embedded data values.

The present method may allow for, e.g. physiological, data to be visualized even when such data is occluded. This may help prevent the user overlooking important occluded or embedded information. Furthermore, the method allows for a volume rendering to be provided which provides context to the user regarding the relative depths and positions of parts of the visualized medical data. In certain examples, the method may help a user to clearly distinguish physiological volume data from anatomical volume data or to distinguish embedded physiological volume data from non-embedded physiological data, e.g. by the use of silhouettes surrounding certain parts of the physiological data.

Moreover, the method may provide an effective visualization in a computationally efficient manner. The first volume rendering process may be computationally inexpensive to compute, e.g. in examples where the first volume rendering process is a maximum and/or minimum intensity projection process. The second volume rendering process may comprise a physically-based rendering process or a direct volume rendering process. The selection of which type of volume rendering process to use at this step may depend on the desired level of realism and the associated level of computational cost. Furthermore, in examples where the method comprises an image-space pass, such a pass may be highly efficient to compute since the image-space partial derivatives to be computed in this pass may be built into modern GPUs.

Figure 4:
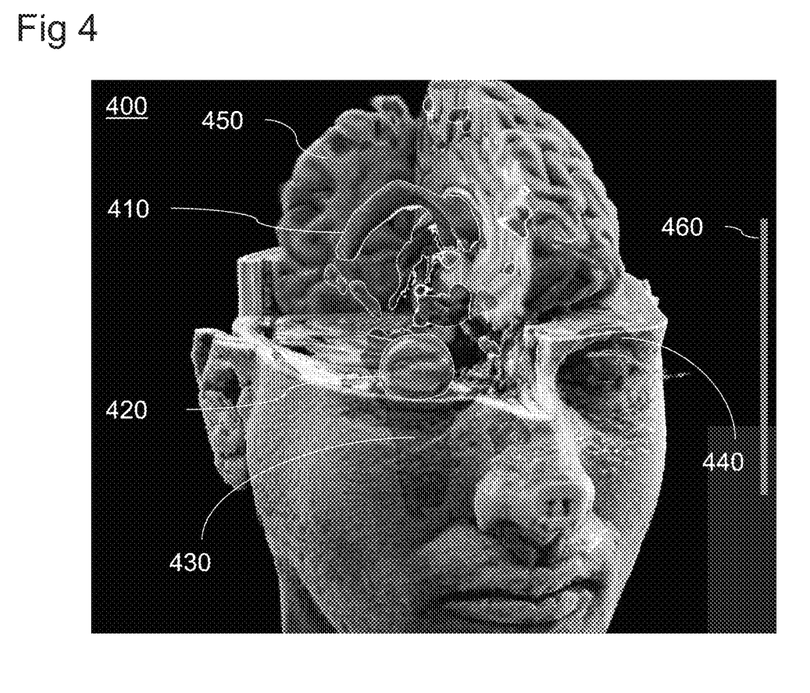
FIGS. 4 to 6 show example visualizations of medical volume data, wherein each of the visualizations has been produced by an example method described herein.
Figure 5:
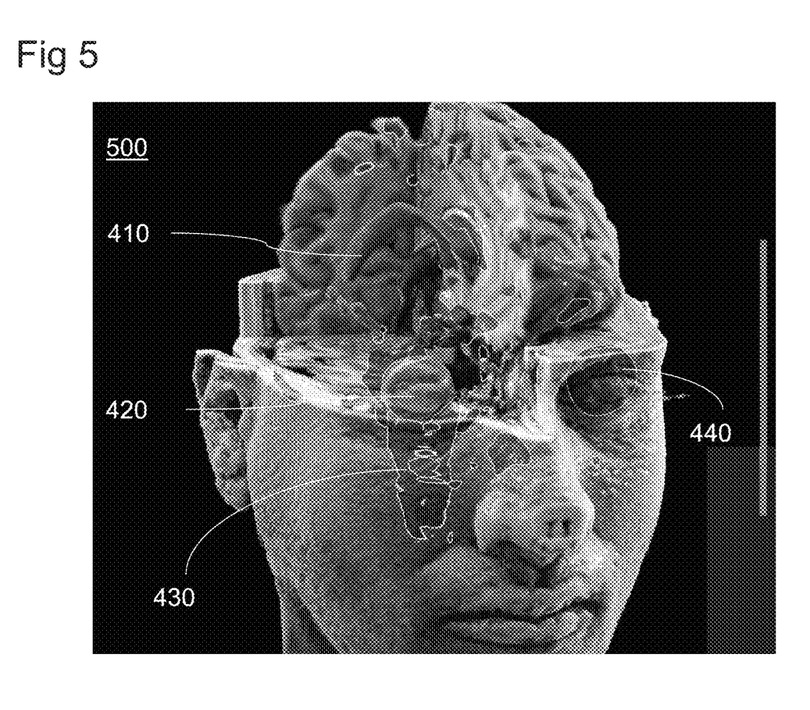
Figure 6:
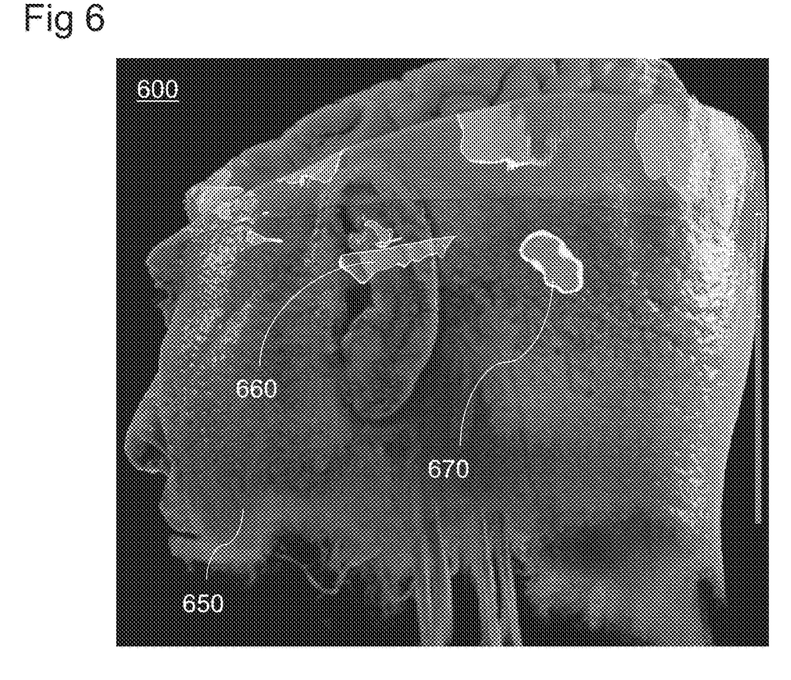

FIGS. 4 to 6 show various examples of visualizations generated by example methods described herein. Each of these examples include features which have been generated by example methods including an image-space pass involving modifying the output of a physically-based volume rendering process on the basis of depths obtained from a maximum intensity projection process.

FIG. 4 shows a first example visualization 400 of medical data depicting the head of a patient. The medical data comprises physiological data, comprising various structures 410, 420, 430, 440, captured by a sodium 7T MRI scan protocol. The medical data also comprises anatomical data, comprising anatomical region 450, captured by a 7T MRI MPRage scan protocol. Values of the physiological data have been constrained such that only a sub-range of the data is visualized. In this example, only regions with high sodium concentrations are included in the sub-range of the physiological data. These regions include, for example, regions 420 and 440 of the eyes of the patient, and certain structures, e.g. region 410, embedded in the brain of the patient. In this example, a segmentation mask has been used on the anatomical data to reveal the brain of the patient, while clipping planes have also been applied to the anatomical data to remove a segment of the anatomical data from the visualization. In this example, the clipping planes act only on the anatomical data and the physiological data is not clipped, as can be seen by the remaining structures 410 and 420 of the physiological data in the region from which the anatomical data has been clipped.

The visualization of FIG. 4 has been produced by an example method including performing a maximum intensity projection pass on the physiological data, followed by a path tracing rendering pass performed on the combination of the physiological data and the anatomical data. During the maximum intensity projection pass, depths of the maximum value of the physiological data have been computed and stored for each pixel. Further, for each pixel, a color corresponding to the sample point of maximum intensity has been computed using a color map 460. During the path tracing pass, the color palette of the anatomical data has been fused with the color palette of the physiological data where the anatomical data and physiological data overlap.

Further, tinting has been applied to sample points in order to visualize embedded points of maximum intensity of the physiological data. For example, regions of the anatomical data, including a region 430 of the right cheek of the patient as well as a region 440 of a left eye of the patient, can be seen to tinted in order to visualize high intensity regions of the sodium physiological data embedded in the anatomical data. This tinting has been done, as described in examples above, by computing during the path tracing pass depths of the closest non-fully transparent volume sample and tinting parts of the volume which occlude a maximum value of the physiological data. Although this may not be seen from the figure, the tinting also applies to regions of the physiological data in which higher intensity values of the physiological data are embedded in lower values of the physiological data, such as the region 420 in the right eye of the patient.

To produce the visualization of FIG. 4, a further image-space rendering pass has been performed following the path tracing pass. During the image-space rendering pass, for regions of the physiological data not embedded in the anatomical data, e.g. regions 410 and 420, silhouettes of the regions have been drawn by computing image-space partial derivatives of the depths from the maximum intensity projection pass and changing to white the color of pixels where the image-space partial derivatives meet a threshold.

Whether a given pixel represents physiological data not embedded in the anatomical data has been determined by a comparison between the depths computed during the maximum intensity projection pass and the depths from the path tracing pass.

FIG. 5 shows a second example visualization 500 produced by an example method described herein. This example shows the same data as FIG. 4. The visualization has been produced in a similar manner to that described for FIG. 4, with the exception that the silhouettes have been applied in the image-space pass only to physiological data which is embedded in the anatomical data, such as the regions 430 and 440.

FIG. 6 shows a third example visualization 600 produced by an example method described herein. In this example, the visualized medical data comprises regions of anatomical data 650, as well as CEST physiological data comprising regions 660 and 670. This example demonstrates the application of silhouettes to regions of physiological data, e.g. regions 660 and 670, embedded in the anatomical data 650. The silhouettes have been applied during an image-space pass, as described with reference to examples above. Furthermore, in this example, a hatching or highlighting effect has been created within the silhouettes of the regions 660 and 670. This hatching effect has been created by appropriate setting of the thresholds to which the image-space partial derivatives of the depths obtained during the maximum intensity projection are compared when determining whether to modify the color of a pixel in image space.

Figure 7:
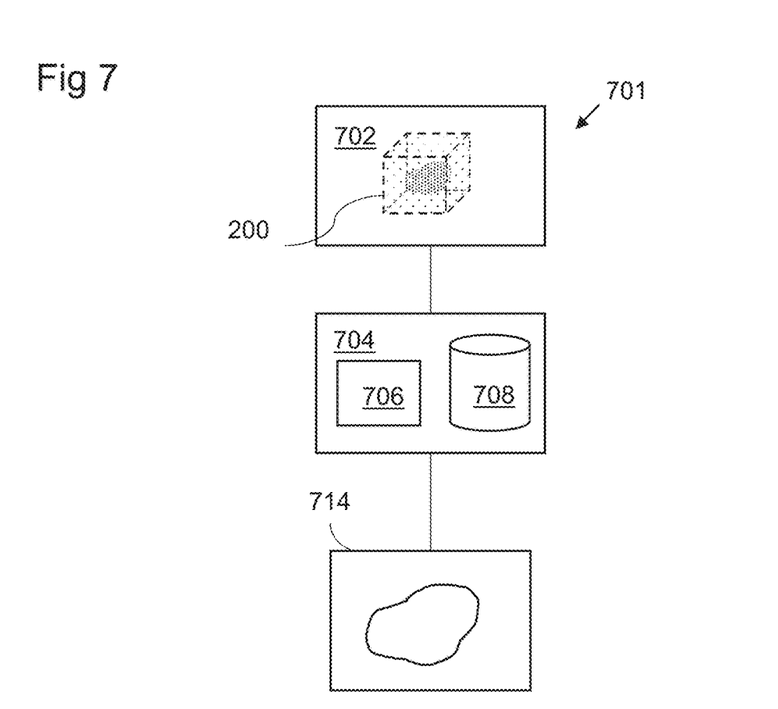
FIG. 7 shows an apparatus for performing example methods described herein.

Referring now to FIG. 7, there is illustrated schematically an example system 701 in which an example apparatus 704 may use methods described herein. The system 701 comprises a scanner 702, the apparatus 704, and a visualization unit 714. In examples, the system may comprise fewer components than or additional components to those illustrated in FIG. 7. For example, the system 701 may comprise a computer network such as the internet.

The scanner 702 may be any scanner for generating a dataset comprising the medical volumetric dataset 200, which, as described may, for example, represent a portion of a patient. For example, the scanner 702 may be a computed tomography (CT) scanner, a magnetic resonance imaging (MRI) scanner, a positron emission tomography (PET) scanner, an ultrasound scanner or the like. The scanner 702 is connected to the apparatus 704, for example via wired or wireless connection. The scanner 702 may be arranged to provide the volumetric dataset to the apparatus 704.

The apparatus 704 comprises a processor 706 and a memory, in the form of a storage 708. The apparatus 704 may, for example comprise a GPU. In this example, the apparatus 704 is arranged to perform the above described method of rendering a visualization of the volumetric dataset 200. The apparatus 704 may for example, comprise one or more processors for operating the volume rendering processes of the method.

The storage 708 may comprise a machine-readable medium comprising a set of machine-readable instructions which when executed by the processor 706 cause the apparatus 704 to perform an example method described herein. The program may be stored on a computer readable medium which may be read by the apparatus 704 to thereby execute the program. The apparatus 704 may be arranged to receive directly or indirectly or otherwise acquire from the scanner 702 the volumetric dataset 200.

The apparatus 704 may be arranged to transmit information, for example, values defining a rendering of the volumetric dataset 200, e.g. a color value for each pixel in an image plane, to a visualization unit 714. The transmission may be direct or indirect, for example via a wired connection, a wireless connection, or via the internet.

The visualization unit 714 may comprise visualization software for displaying a two-dimensional projection of the volume 200 produced by the apparatus 704. The visualization unit 714 may comprise a display screen, and one or more graphics hardware or software components. In some examples, the visualization unit 714 may be or comprise a mobile device. In some examples the visualization unit 714 may comprise a virtual reality or augmented reality device. The visualization unit 714 may in some examples display a stereo image.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

The above embodiments are to be understood as illustrative examples of the present invention. Other embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

What is claimed is:

1. A computer-implemented method for rendering medical volume data including first volume data, the computer-implemented method comprising:
    performing a first volume rendering process on the first volume data to generate a first volume rendering of the first volume data, the first volume rendering process including determining first depths of respective locations of the first volume rendering and storing the first depths in association with the respective locations;
    performing a further process, including a second volume rendering process, on the first volume data and second volume data, to generate a second volume rendering, using the first depths and the respective locations;
    wherein the using the first depths and the respective locations to generate the second volume rendering includes determining partial derivatives of the first depths with respect to the respective locations in response to the first depth at a given location being greater than a second depth of the second volume data at the given location, and modifying a visual parameter value of an output of the second volume rendering process on the basis of the partial derivatives; and wherein the first volume data includes physiological volume data and the second volume data includes anatomical volume data.

2. The method according to claim 1, wherein the first volume rendering process comprises at least one of a maximum intensity projection volume rendering process or a minimum intensity projection volume rendering process.

3. The method according to claim 2, wherein the first volume rendering process comprises:

determining a first visual parameter value for a given first sample point in the first volume data, the given first sample point being associated with a second given respective location of the respective locations; and storing the first visual parameter value in association with the second given respective location.

4. The method according to claim 2, wherein the using the first depths and the respective locations to generate the second volume rendering further comprises:

setting, on the basis of the first depths and the respective locations, a parameter value of the second volume rendering process.

5. The method according to claim 1, wherein the first volume rendering process comprises:

determining a first visual parameter value for a given first sample point in the first volume data, the given first sample point being associated with a second given respective location of the respective locations; and storing the first visual parameter value in association with the second given respective location.

6. The method according to claim 1, wherein the using the first depths and the respective locations to generate the second volume rendering further comprises:

setting, on the basis of the first depths and the respective locations, a parameter value of the second volume rendering process.

7. The method according to claim 6, wherein the second volume rendering process is a physically-based volume rendering process.

8. The method according to claim 6, wherein the second volume rendering process comprises:

determining second depths of the respective locations; and storing the second depths in association with the respective locations, wherein the setting or the modifying is performed, for a second given location of the respective locations, on the basis of a comparison between the first depth and the second depth of the second given location.

9. The method according to claim 8, wherein the modifying comprises:

combining, at the second given location of the respective locations, a first visual parameter value from the first volume rendering process with a second visual parameter value from the second volume rendering process.

10. The method according to claim 8, wherein the visual parameter value of the second volume rendering process is a visual parameter value of a given second sample point associated with the second given location, and wherein the setting includes determining the visual parameter value of the given second sample point based on a first visual parameter value from the first volume rendering process.

11. The method according to claim 1, wherein the modifying comprises:

combining, at a second given location of the respective locations, a first visual parameter value from the first volume rendering process with a second visual parameter value from the second volume rendering process.

12. The method according to claim 1, wherein the first volume data and the second volume data have a spatial relationship, and wherein the performing the further process includes performing the second volume rendering process on a combination of the first volume data and the second volume data.

13. The method according to claim 12, wherein the modifying comprises:

combining, at a second given location of the respective locations, a first visual parameter value from the first volume rendering process with a second visual parameter value from the second volume rendering process.

14. The method according to claim 1, wherein the visual parameter value of the output of the second volume rendering process is a visual parameter value of a first given location of the respective locations, and the modifying the visual parameter value of the output of the second volume rendering process includes determining, at the first given location, whether a partial derivative meets a threshold, setting a color value at the first given location to white in response to the partial derivative at the first given location exceeding the threshold, and setting the color value at the first given location to indicate shading or cross-hatching based on the partial derivative in response to the partial derivative being less than or equal to the threshold.

15. A non-transitory machine-readable medium comprising a set of machine-readable instructions that, when executed by a processor, cause the processor to perform the method according to claim 1.

16. An apparatus comprising:

a processor; and a storage including a set of machine-readable instructions that, when executed by the processor, cause the processor to perform the method according to claim 1.

* * * * *